United States Patent
Sinha

(10) Patent No.: US 7,400,587 B2
(45) Date of Patent: Jul. 15, 2008

(54) OPTIMUM FRAME FRAGMENTATION METHOD FOR COMMUNICATION OVER ERROR PRONE CHANNELS

(75) Inventor: Amit Sinha, Acton, MA (US)

(73) Assignee: Edgewater Computer Systems, Inc., Ottawa, Ontario (CA)

( * ) Notice: Subject to any disclaimer, the term of this patent is extended or adjusted under 35 U.S.C. 154(b) by 859 days.

(21) Appl. No.: 10/712,797

(22) Filed: Nov. 13, 2003

(65) Prior Publication Data

US 2004/0141503 A1    Jul. 22, 2004

Related U.S. Application Data

(60) Provisional application No. 60/425,967, filed on Nov. 13, 2002.

(51) Int. Cl.
*G06F 11/00*    (2006.01)
(52) U.S. Cl. ....................................................... 370/241
(58) Field of Classification Search ................. 370/335, 370/336, 329, 438, 466, 470
See application file for complete search history.

(56) References Cited

U.S. PATENT DOCUMENTS

| | | | |
|---|---|---|---|
| 5,307,351 A * | 4/1994 | Webster | 370/470 |
| 6,236,647 B1 * | 5/2001 | Amalfitano | 370/335 |
| 6,434,120 B1 * | 8/2002 | Natarajan et al. | 370/255 |
| 6,446,122 B1 * | 9/2002 | Rawat et al. | 709/224 |
| 6,469,991 B1 * | 10/2002 | Chuah | 370/329 |
| 6,493,352 B1 * | 12/2002 | Mawhinney et al. | 370/458 |
| 7,016,948 B1 * | 3/2006 | Yildiz | 709/221 |
| 7,096,274 B1 * | 8/2006 | Ci et al. | 709/236 |
| 2004/0029612 A1 * | 2/2004 | Gorsuch | 455/552.1 |
| 2004/0141522 A1 * | 7/2004 | Texerman et al. | 370/466 |
| 2007/0019676 A1 * | 1/2007 | Kompella | 370/468 |

* cited by examiner

*Primary Examiner*—Kwang Bin Yao
*Assistant Examiner*—Syed Bokhari
(74) *Attorney, Agent, or Firm*—Hamilton, Brook, Smith & Reynolds, P.C.

(57) ABSTRACT

A frame fragmentation method for digital communications over error prone channels is presented. The technique maximizes data throughput based on the bit error rate and frame overhead. The technique can be used to determine optimum fragmentation thresholds for wireless links that are characterized by significant bit error rates.

13 Claims, 7 Drawing Sheets

US 7,400,587 B2

OPTIMUM FRAME FRAGMENTATION METHOD FOR COMMUNICATION OVER ERROR PRONE CHANNELS

RELATED APPLICATIONS

This application claims the benefit of U.S. Provisional Application No. 60/425,967, filed on Nov. 13, 2002. The entire teachings of the above application are incorporated herein by reference.

BACKGROUND OF THE INVENTION

FIG. 1 is a block diagram of a data communication system. Frames are transferred over a communications link 104 between a transmitter 100 and a receiver 102. A physical (PHY) layer 108 performs physical transmit and receive functions over the communications link 104. A Media Access Control (MAC) layer 106 assembles data received from higher network layers (through data in/data out) into a frame for transmission and dis-assembles frames received from the physical layer 108. In addition to the data, each frame also includes a header that includes control information such as, source and destination addresses.

Data is transferred over the communications link 104 using a standard protocol. One popular standard protocol is the Institute of Electrical and Electronics Engineers (IEEE) 802.11 Media Access Control and physical layer protocol. The IEEE 802.11a, IEEE 802.11b and IEEE 802.11g standards define different modulation formats that can be used by an IEEE 802.11 compliant system.

In a connection orientated network protocol such as the IEEE 802.11 standard, an acknowledgment is sent from the receiver, in response to a received frame, to indicate successful delivery of the frame. FIG. 2 illustrates acknowledgement of frames 200 transmitted over the communications link 104 shown in FIG. 1. Each frame 200 includes a payload (F) 204 and a header 202. The overhead (O) 208 is the time between transmission of payloads 204. The overhead 208 in the IEEE 802.11 standard includes frame preamble and header bits 202, inter-frame spacing requirements 210, and acknowledgement frames 212 transmitted by the receiver 102.

If the transmitter from which the frame was transmitted does not receive an acknowledgement within a particular time period, the transmitter re-transmits the frame until an acknowledgement is received or the maximum number of re-transmissions has been reached. The larger the frame, the higher the probability of incurring an error because all bits must be transmitted correctly for the entire frame to be received correctly.

A Bit Error Rate (BER) (the percentage of error bits relative to the number of bits transmitted) characterizes the reliability of the communications link. For example, a bit error rate of $10^{-4}$ indicates one error bit in every 10,000 bits transmitted. Typically wireless networks are less reliable then wired networks.

To reduce the probability of incurring an error, some network protocols including the IEEE 802.11 standard permit large blocks of data to be broken into fragments by the transmitter dependent on a selected fragmentation threshold. Each fragment is transmitted and acknowledged individually and the fragments are reassembled by the receiver.

The IEEE 802.11 standard defines a fragmentation and de-fragmentation procedure for unicast frames; that is, frames that are transmitted from a single sender to a single receiver. The fragmentation and de-fragmentation procedure is performed by the MAC layer 106. Data to be transmitted from the transmitter 100 to the receiver 102 using the IEEE 802.11 standard is received by the MAC layer 106 in the transmitter 100 in the form of a MAC Service Data Unit (MSDU).

FIG. 3 illustrates fragmentation of an IEEE 802.11 MSDU 300 into three fragments 302a-c. If the number of bits in the MSDU to be transmitted to the physical layer is larger than a selected fragmentation threshold, the MAC layer 106 breaks the MSDU 300 into smaller chunks and transmits each chunk independently through the physical layer in a frame body 304 of a separate fragment 302a-c preceded by a header 306 and followed by a trailer 308. A fragmentation threshold defines the number of bits stored in the frame body 304 of the fragment 302a-c.

FIG. 4 is a block diagram of an IEEE 802.11 fragment 400 including a header 306 preceding the frame body 304 and a trailer (Frame Check Sequence (FCS)) 308 after the frame body. The header 306 includes a frame sequence number field 414 and a fragment number field 412. Fragments associated with an MSDU are typically transmitted in a single fragment burst. Each fragment transmitted in a fragment burst has the same frame sequence number but has an ascending fragment number allowing fragments to be reassembled by the receiver.

The frame control field 402 includes frame type and control information. The duration/connection identifier field 404 stores the channel allocation time. The address fields 406, 408, 410, 416 store addresses including the source address and the destination address. The frame body 304 stores a chunk of the MSDU 300 received by the MAC layer 106. The frame check sequence field 308 stores a 32 bit Cyclic Redundancy Check for the fragment 400.

FIG. 5 illustrates the transmission of the fragments 302a-c shown in FIG. 3 in a single fragment burst 500. Upon receipt of a fragment, the receiver returns an acknowledgement (ACK) frame 502a-c to acknowledge receipt of the frame. If no ACK frame 502a-c is received in reply to a transmitted fragment 302a-c, the transmitter re-transmits the fragment 302a-c until an ACK frame 502a-c is received or the maximum number of re-transmissions of the fragment 302a-c has been reached.

Transmitting a plurality of fragments 302a-c each storing a portion of the MSDU 300 instead of the MSDU 300 increases the probability of a successful transmission in cases where the channel reliability is limited and allows a smaller fragment to be repeatedly re-transmitted if necessary.

Data throughput over a link is dependent on the size of re-transmitted frames and the protocol overhead associated with each frame. The probability of losing a fragment over an error prone communications link decreases as the size of the fragment decreases. However, protocol overhead increases because additional overhead is required for each fragment reducing the effective data throughput.

SUMMARY OF THE INVENTION

An optimum frame size selection method for frame based communication links is provided. The method is general and can be adapted to specific requirements of a given protocol. The optimum frame size is a function of the overhead and bit error rate of a link. The communications link is monitored to determine a probability of bit error on the link and a frame size is selected as a function of the determined probability.

The optimum frame size is computed numerically as the solution to the transcendental equation:

$$1 + \frac{O}{F_{opt} + O} = \frac{\alpha F_{opt}}{1 - e^{-\alpha F_{opt}}}$$

where O is overhead, $F_{opt}$ is optimum frame size and $\alpha = -\ln(1-\text{probability of bit error})$.

When the overhead is significantly larger than the frame size, the optimal frame size is inversely proportional to the natural logarithm of the bit error rate of the link. The signal to noise ratio on the communications link or the frame rate on the communications link may be monitored to determine the probability of error.

Frames may be transmitted over the communications link using the IEEE 802.11 media access control and physical layer protocol and the frame may be one of a plurality of fragments in a transmitted fragment burst.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The invention is described for maximizing throughput in a communications link using the IEEE 802.11 media access control and physical layer protocol. However, the invention is not limited to the IEEE 802.11 standard, the invention can be used for any protocol that supports a variable packet format.

Figure 1:
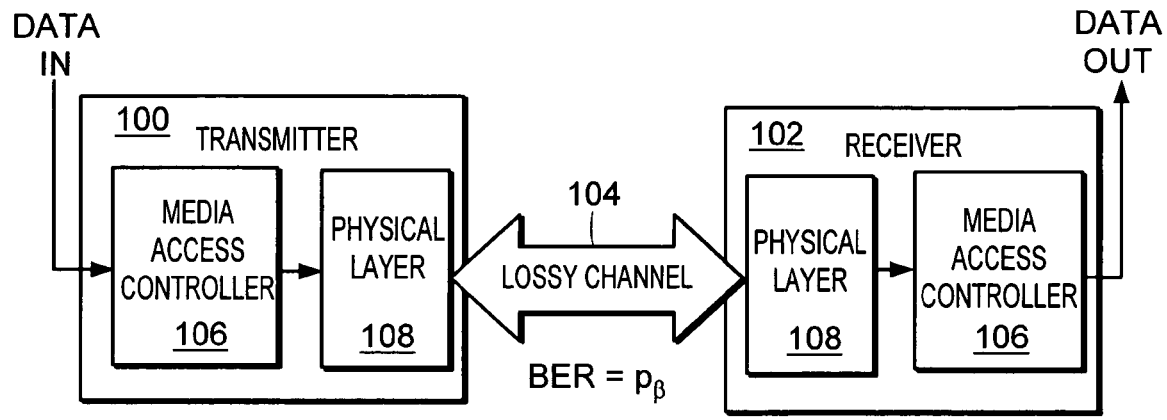
FIG. 1 is a block diagram illustrating lower protocol layers of the IEEE 802.11 standard in a receiver and a transmitter.
Figure 2:
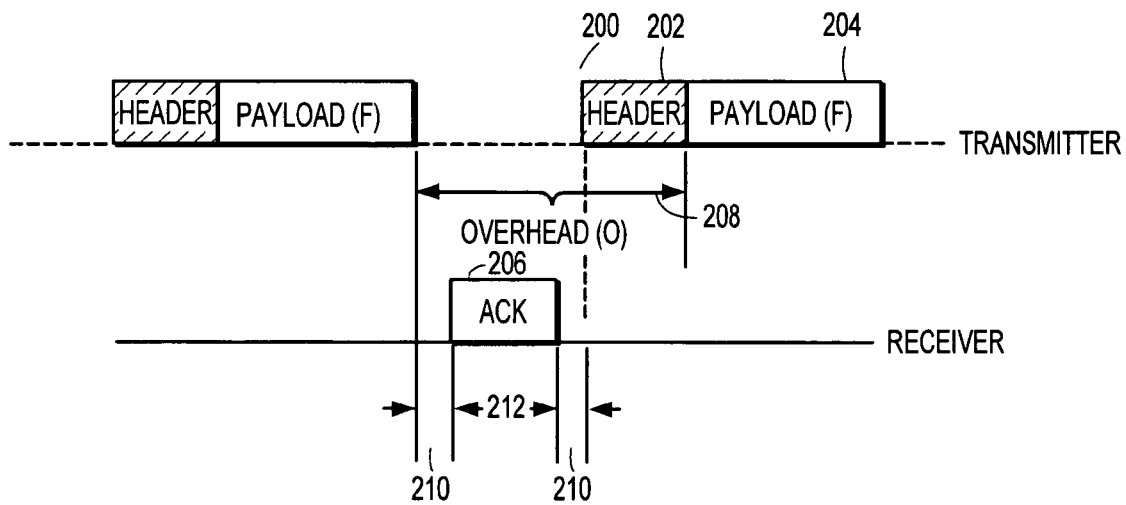
FIG. 2 illustrates acknowledgement of frames transmitted over a communication line using the IEEE 802.11 standard.
Figure 3:
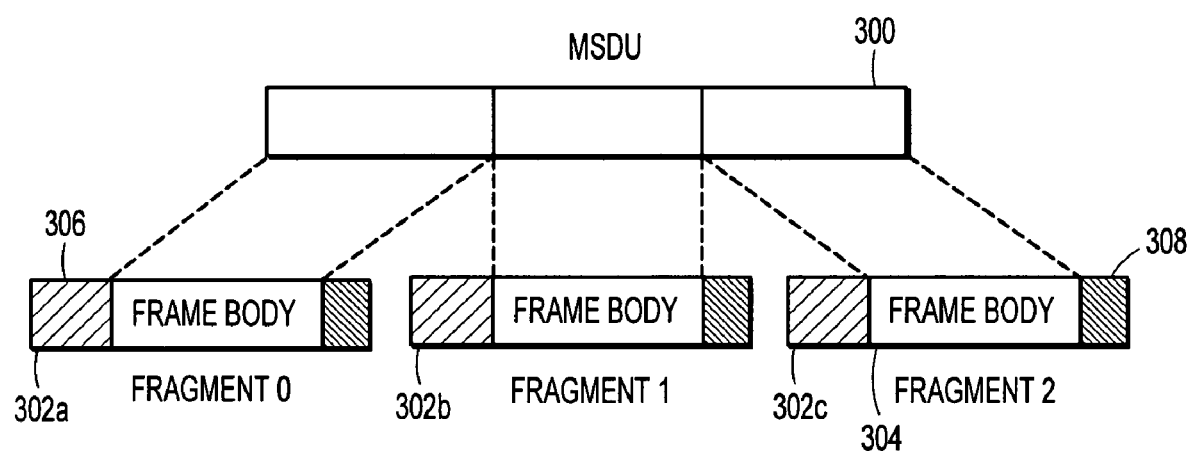
FIG. 3 illustrates fragmentation of a received MSDU into three fragments.
Figure 4:
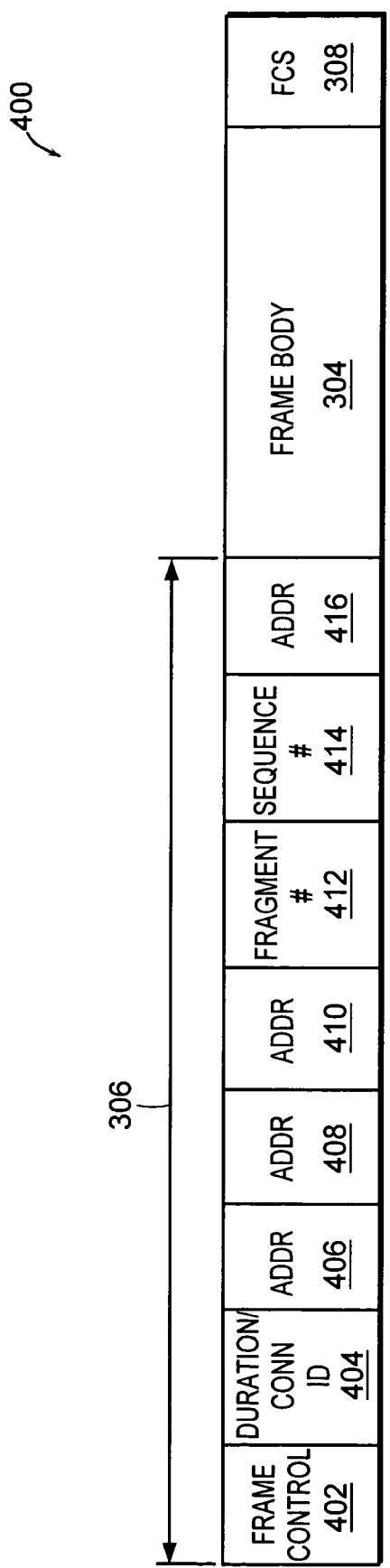
FIG. 4 is a block diagram of an IEEE 802.11 fragment including a header and frame check sequence.
Figure 5:
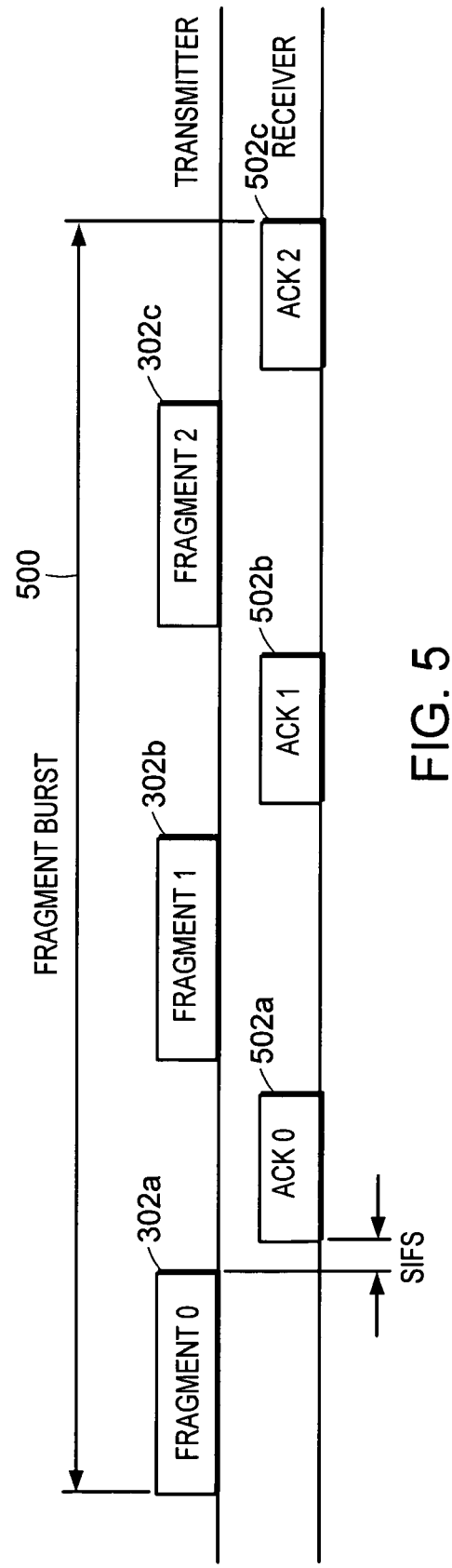
FIG. 5 illustrates the transmission of the fragments shown in FIG. 3 in a single fragment burst.
Figure 6:
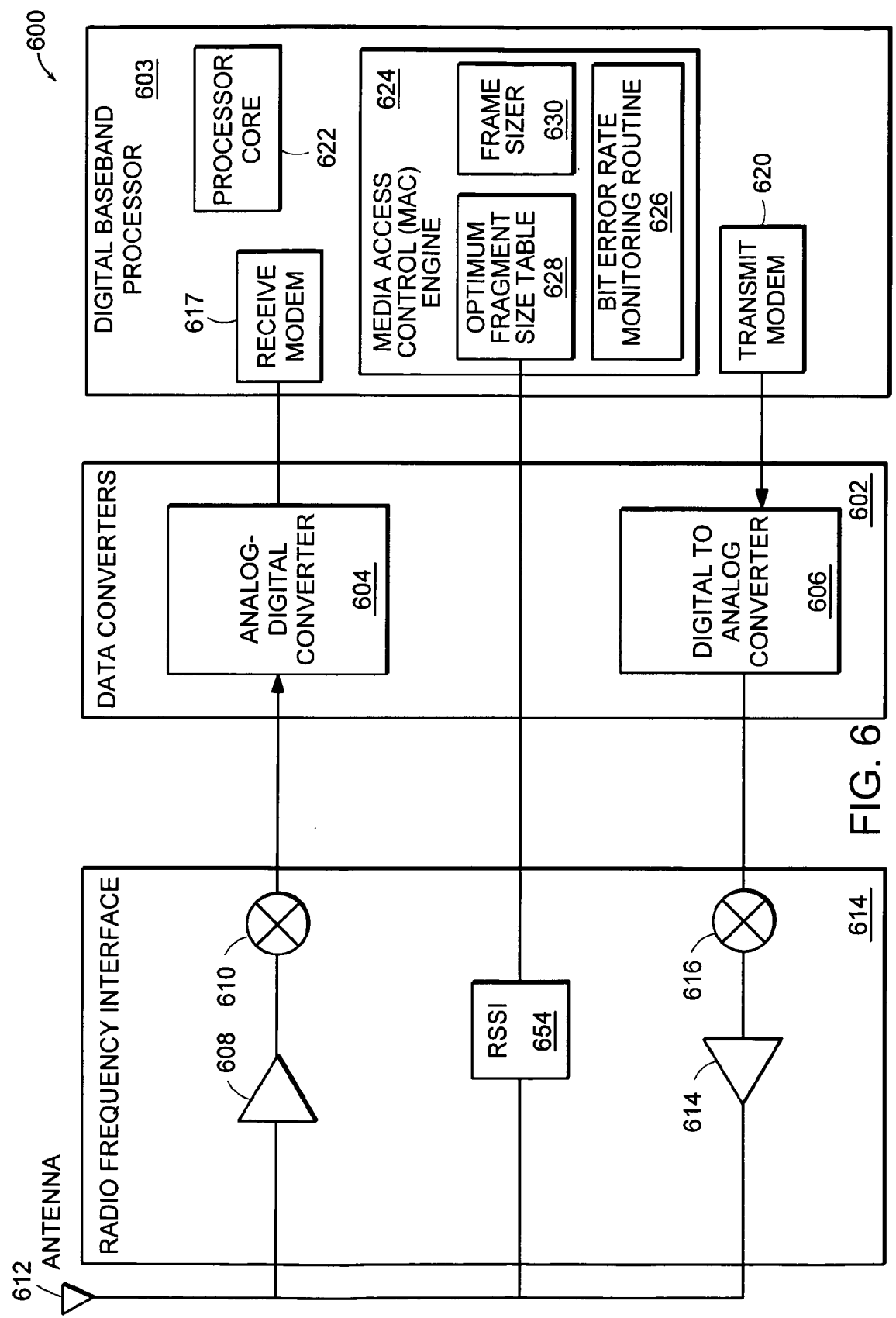
FIG. 6 is a block diagram of a system which selects optimum frame size as a function of probability of error on a communications link according to the principles of the present invention.

FIG. 6 is a block diagram of a system 600 which selects optimum frame size as a function of probability of error on a communications link according to the principles of the present invention. The system 600 receives and transmits IEEE 802.11 frames over a wireless communications link through antenna 612.

Signals received by the antenna 612 from clients are coupled to a low noise amplifier 608. The amplified signals are coupled to a down convert mixer 610 that converts high frequency signals to low frequency signals. The amplified and converted signal is coupled to an analog-digital converter 604 in the signal conversion circuit 602 to convert the amplified analog signal to a digital signal.

The digital baseband processor 603 includes a receive modem 617 and a transmit modem 620. The digital signal output from the analog-digital converter 604 is coupled the receive modem 617 to extract the digital signal.

Downloads to clients on the wireless network originate in the transmit modem 620. The output of the transmit modem 620 is coupled to the digital to analog converter 606 for conversion to an analog signal to be transmitted over the wireless network through antenna 612.

The analog signal output from the digital-analog converter 606 is coupled to an up convert mixer 616. An amplifier 614 coupled to the up convert mixer 616 amplifies the respective analog signal. The radio frequency interface 614 also includes a Received Signal Strength Indication Circuit (RSSI) 654 coupled to the antenna 612 for detecting the power of received signals.

The system 600 includes a digital base band processor 603 that includes a MAC engine 624. The MAC engine 624 monitors errors in a communications link to determine probability of error on the link and selects frame size as a function of the determined probability to maximize throughput on the communications link.

As has already been described in conjunction with FIGS. 1-5, the IEEE 802.11 standard allows a fragmentation threshold to be selected for a communications link between a transmitter and a receiver. Upon receiving a MAC Service Data Unit (MSDU) 300 frame that is larger than the selected fragmentation threshold, the MAC engine 624 breaks the MSDU into smaller chunks based on a selected fragmentation threshold and transmits each chunk individually in a separate fragment 300 preceded by a header 306 and followed by a trailer 308.

The MAC engine 624 includes an optimum fragment size table 628 which stores optimum fragment size $F_{opt}$ for a discrete set of values spanning a range of Bit Error Rates (BERs) and overheads within which the system is specified to operate. A Bit Error Rate monitoring routine 626 in the MAC engine 624 executed by a processor core 622 obtains a current estimate of the BER of the communications link. Having obtained the current estimated BER, a frame sizer 630 in the MAC engine 639 compares the estimated BER with the previous estimated BER to determine if a new optimum fragment size should be selected. If a new optimum fragment size is necessary, the optimum fragment's size corresponding to the new estimated BER is selected from the optimum fragment size table 628. The method for computing the optimum frame sizes as a function of overhead and bit error rate of the link to be stored in the optimum fragment table is described as follows.

Returning to FIG. 2, the optimum frame size is dependent on the BER of the communications link. In the absence of any forward error correction, the probability that the receiver successfully gets the frame is simply the probability that none of the bits in the payload (P) are in error. The probability of the frame being received with errors, $p_F$, is given by:

$$p_F = 1-(1-p_b)^F \qquad (1)$$

where F is the number of bits in the frame and $p_b$ is the probability of bit error of the communications link.

Assuming that the equivalent overhead 208 required for transmitting the frame once is O bits. The overhead O includes the preamble and header 202, inter-frame delays 210 and acknowledgement packets 212. If the peak data transfer rate is R, the maximum throughput $T_{max}$ of the link is given by:

$$T_{max} = R\left(\frac{F}{O+F}\right) \qquad (2)$$

If the transmitter does not receive an acknowledgement packet 212, it assumes that the frame was lost and re-transmits. Assuming, that the maximum number of re-transmissions the transmitter attempts before dropping the frame altogether is given by L. If the frame is successfully transmitted on the first attempt, the throughput is $T_{max}$, if it takes two attempts, the throughput drops to $T_{max}/2$ assuming that the overhead is the same for each attempt. Each subsequent attempt results in a further drop in the throughput. Therefore, the expected throughput over the link is by:

$$T = \sum_{k=1}^{L} p_F^{k-1}(1-p_F)\left(\frac{T_{max}}{k}\right) \qquad (3)$$

Equation (3) assumes that the channel is fairly stationary; that is, the probability of bit error and the overhead remain constant over successive re-transmission attempts. Assuming infinite re-transmission attempts, the expected throughput is upper bound as follows:

$$T_\infty = \lim_{L\to\infty} T = -T_{max}(1-p_F)\frac{\ln(1-p_F)}{p_F} \qquad (4)$$

Where the following infinite series expansion is used:

$$\ln(1-x) = -x - \frac{x^2}{2} - \frac{x^3}{3} - \frac{x^4}{4} \cdots \quad -1 \leq x < 1 \qquad (5)$$

Using $\alpha=-\ln(1-p_b)$ in equation (1) and substituting in equation (4) results in the following:

$$T_\infty = R\left(\frac{\alpha F^2}{O+F}\right)\left(\frac{e^{-\alpha F}}{1-e^{-\alpha F}}\right) \qquad (6)$$

Differentiating equation (6) with respect to F and setting the partial derivative equal to 0, results in the following:

$$\frac{\partial T_\infty}{\partial F} = R\left(\frac{\alpha F}{O+F}\right)\left(\frac{e^{-\alpha F}}{1-e^{-\alpha F}}\right)\left[\frac{F+2O}{F+O} - \frac{\alpha F}{1-e^{-\alpha F}}\right] \qquad (7)$$

-continued $$\frac{\partial T_\infty}{\partial F} = 0 \Rightarrow 1 + \frac{O}{F_{opt}+O} = \frac{\alpha F_{opt}}{1-e^{-\alpha F_{opt}}} \qquad (8)$$

The solution to transcendental equation (8) defines the optimum fragment size, $F_{opt}$, which maximizes throughput over the communications link as a function of overhead and bit error rate of a link.

Figure 7:
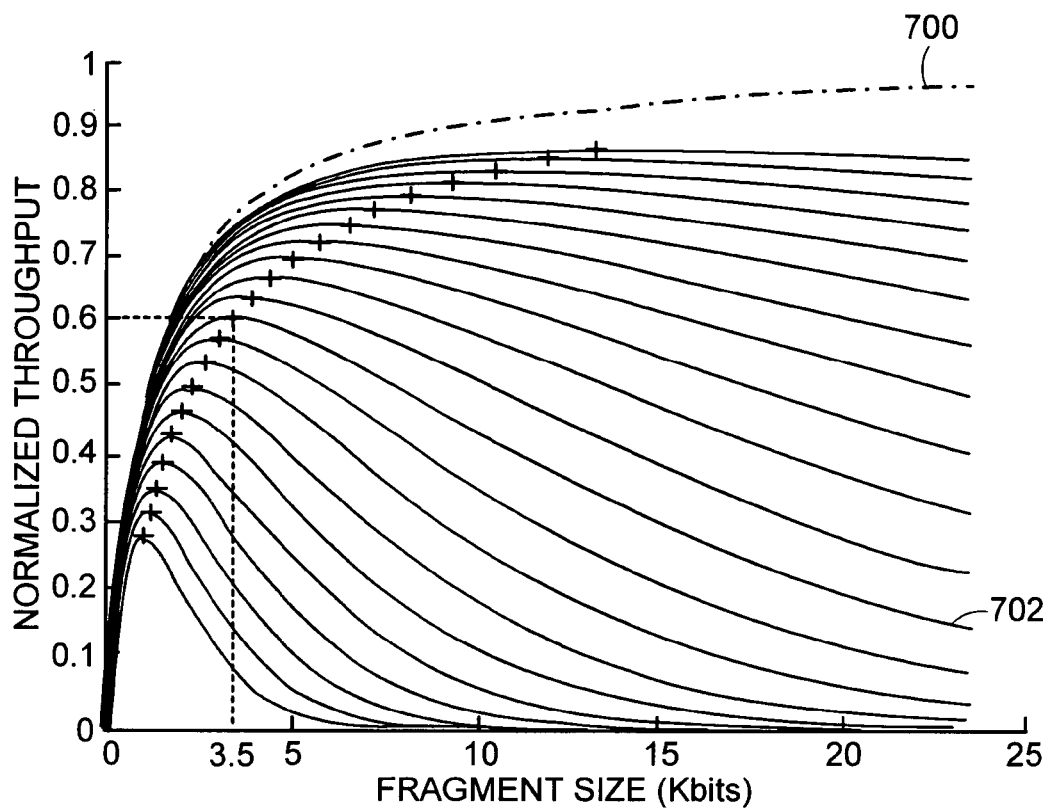
FIG. 7 is a graph of normalized throughput, $T_\infty/R$, as a function of fragment size with overhead O of 1 K bits for a probability of bit errors $p_b$.

FIG. 7 is a graph of normalized throughput, $T_\infty/R$, as a function of fragment size with an overhead O of 1 K bits for a range of probability of bit errors $p_b$. Trace 700 shows the maximum theoretical normalized throughput, $T_{max}/R$. The other traces plot the behavior of the throughput function for different probability of BERs in the range $10^{-5} \leq p_b \leq 10^{-3}$. As shown, there is an optimum fragment size for each probability of BER that maximizes throughput. It can be observed from the graph that a bad fragment size selection can degrade throughput by an order of magnitude. As shown, for trace 702, the optimum fragment size is 3.5 K bits.

Figure 8:
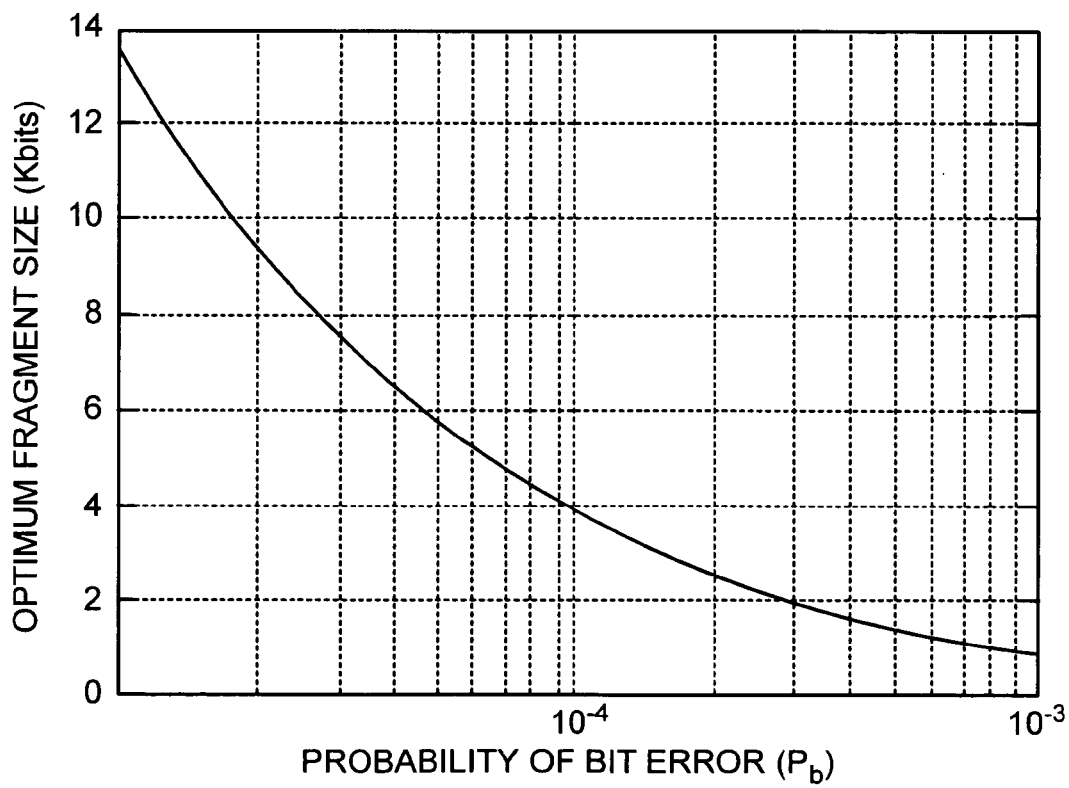
FIG. 8 is a graph of optimum fragment size as a function of the probability of BER over the channel.

FIG. 8 is a graph of optimum fragment size (marked by '+' in FIG. 7) as a function of the probability of BER over the channel with a constant overhead of 1 K bits. This graph is equivalent to the numerical solution of Equation (8) for the range of probability of errors $p_b$ shown. As shown, as the BER of the communications link increases, throughput is maximized by selecting smaller length frames. For example, for a BER of $10^{-4}$, the optimum packet size is about 4 K bits as the BER increases to $10^{-3}$, and the optimum packet size decreases to about 1 K bits. The optimum fragment sizes are stored in the optimum fragment size table 628.

Figure 9:
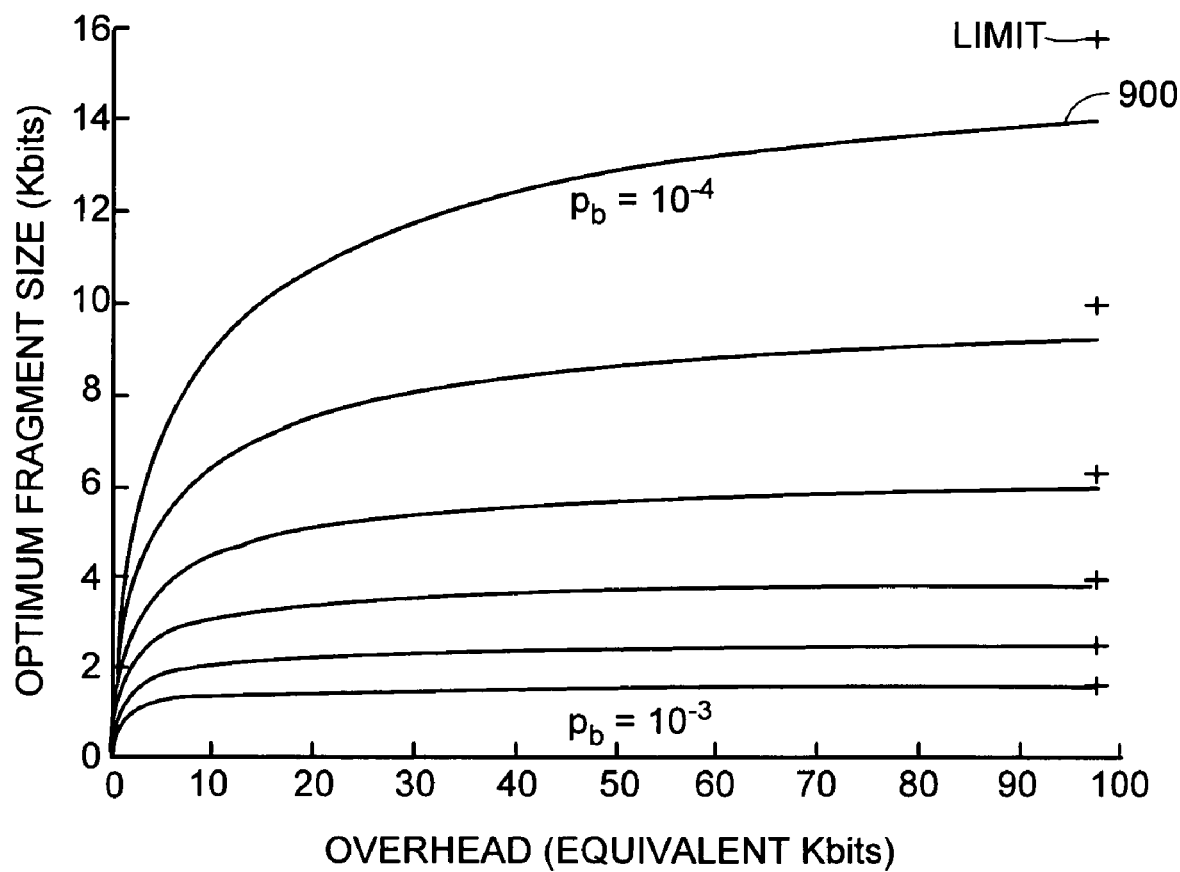
FIG. 9 is a graph of optimum fragment size as a function of overhead bits for a range of probability of BERs.

FIG. 9 is a graph of optimum fragment size as a function of overhead bits for a range of probability of BERs. When the overhead is small, the optimum fragment size varies dramatically. As shown, trace 900 representing the optimal fragment size as a function of overhead for a probability of bit error of $10^{-4}$, when the overhead is less than 10 K bits, the optimum fragment size varies from about 0 K bits to about 9 K bits. As the overhead increases, the optimum fragment size tends towards a limit. For example, the optimal fragment size as a function of overhead for a probability of bit error of $10^{-4}$ tends toward a limit of about 14 K bits.

When the overhead is negligible with respect to the payload, the overhead O approaches the smallest possible frame size; that is, O→0 in equation (8) resulting in:

$$\frac{\alpha F_{opt}}{1-e^{-\alpha F_{opt}}} \to 1 \Rightarrow F_{opt} \to 0 \qquad (9)$$

Equation (9) suggests that as the frame overhead becomes negligible, the optimum frame size is the smallest possible frame that can be transmitted. The intuitive argument behind this observation is that if there was no overhead, the smallest frame can be transmitted (with the lowest probability of error) and the occasional frame incurring an error can be re-transmitted with little or no overhead cost. Examples of such systems are dedicated links with little or no media access contention. A time division multiplexed link such as a T1 connection is an example of a system with no media access contention.

When overhead is high with respect to the fragment sizes (O>>F), the optimum fragment size asymptotically approaches a limit determined by $$\frac{\alpha F_{opt}}{1-e^{-\alpha F_{opt}}} \to 2 \Rightarrow F_{opt} \to \frac{1.6}{\alpha} \quad (10)$$

This limit is shown by '+' marks in FIG. 7. Equation (10) suggests that when the overhead is large, the optimum fragment size depends solely on the BER; that is, the optimum fragment size is inversely proportional to the natural logarithm of the BER. Examples of such systems includes links with high media access contention and a large number preamble/header bits. A wireless Local Area Network (LAN) system is an example of a shared medium based system where individual "clients" must reserve the medium through a Media Access Control (MAC) protocol which incurs substantial overhead.

Equation (3) is upper bounded using equation (4) for analytical ease. Real systems have a finite re-transmission limit. However, equation (5) converges quite rapidly and the upper bound is tight even for systems characterized by small L.

Returning to FIG. 6, the Bit Error rate monitoring routine 626 can obtain the estimate of the BER in several ways. One way to obtain the estimate is by using a received signal to noise ratio (SNR) estimate and computing bit error rate (BER) known theoretically for the particular modulation scheme and SNR. SNR measurements are routinely performed in communication systems using a Received Signal Strength Indicator (RSSI) and the measured noise floor in the system. Every communications system has noise. The measured noise floor is the estimated noise power level. The ratio of the signal power level to the noise power level is the SNR which determines the bit error rate in the system. Another way to obtain the estimate is by using the MAC engine 624 to keep track of the frame error rates and frame sizes. Equation (1) can be approximated as $p_F \approx Fp_b$, and knowing the frame sizes and corresponding frame error rates, the BER can be estimated. For example, the IEEE 802.11 standard allows frame error rates to be monitored by detecting an acknowledgement frame received in response to a transmitted frame.

The optimum fragment size $F_{opt}(p_b,O)$ is determined numerically for a discrete set of values spanning the range of BERs and overheads that the system is specified to operate within. The computed optimum fragment sizes are stored in the lookup table of optimum fragment sizes as a function of BERs and overheads. For example, the numerical solution of Equation (8) shown in FIG. 8 can be stored in the lookup table. The lookup table is used to determine optimum size based on bit error rate.

Figure 10:
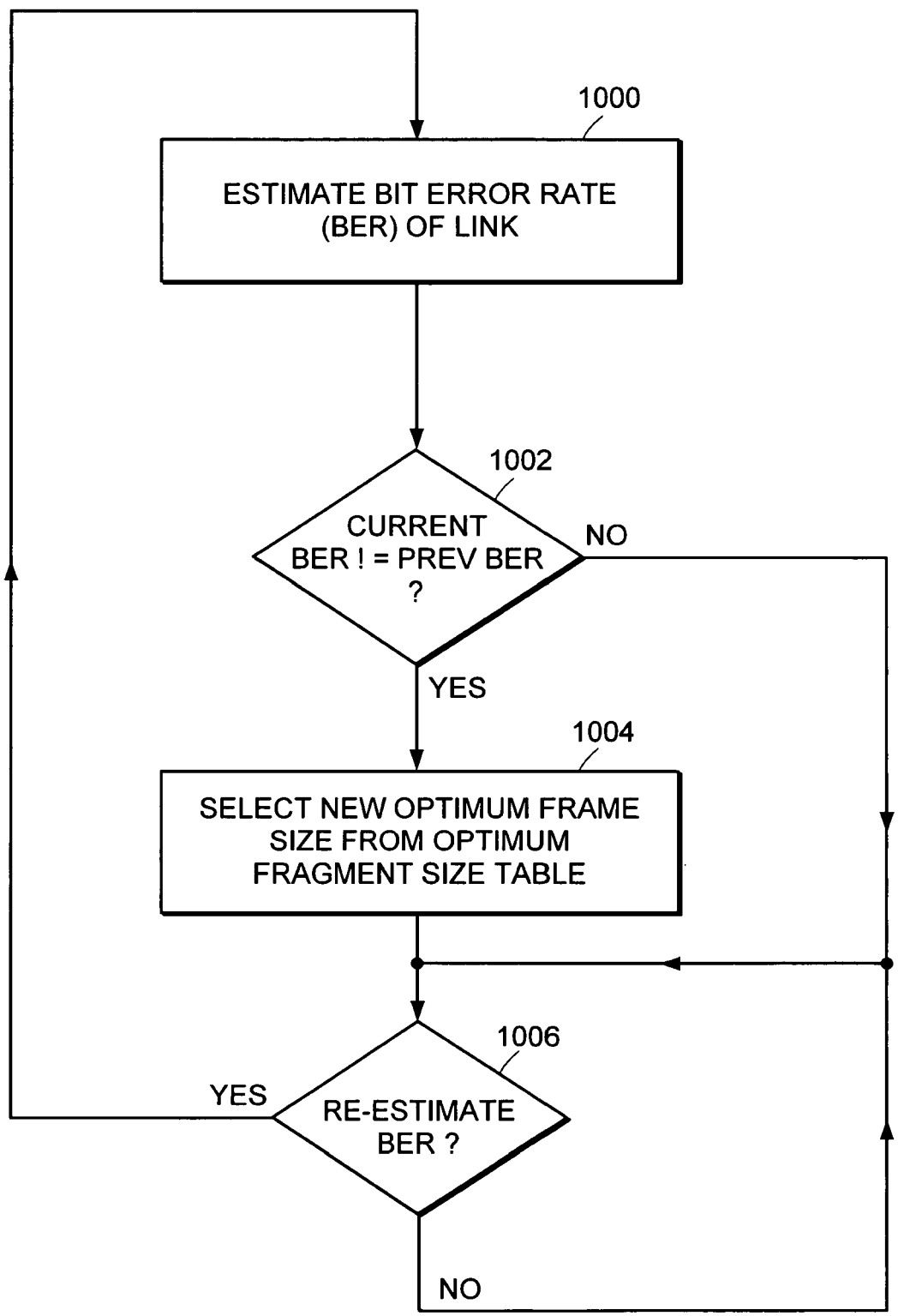
FIG. 10 is a flowchart of a method for selecting optimum fragment size as a function of Bit Error Rate according to the principles of the present invention.

FIG. 10 is a flowchart of a method for selecting optimum fragment size as a function of Bit Error Rate according to the principles of the present invention. The method is implemented in the BER monitoring routine 626 and frame sizer 630 in the MAC engine 624 described in conjunction with FIG. 6.

At step 1000, an estimate of the BER of the link is obtained as described in conjunction with FIG. 6. Processing continues with step 1002.

At step 1002, the current estimated BER is compared with the previous estimated BER to determine if a new optimum fragment size should be selected. If a new optimum fragment size if necessary, processing continues with step 1004. If not, processing continues with step 1006.

At step 1004, the size of the optimum fragment corresponding to the new estimated BER is selected from the option fragment size table 628. Processing continues with step 1006.

At step 1006, the time to re-estimate BER is checked to determine if the BER should be re-estimated. The frequency with which the optimum fragment size is computed is dependent on the time constant over which the probability of bit error and the overhead remain stationary. If the BER should be re-estimated, processing continues with step 1000.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of transmitting frames on a communication link comprising:
   monitoring the communications link to determine a probability of error on the link; and
   selecting frame size as a function of the determined probability and as a function of overhead, the selected frame size being selected from a set of frame sizes computed numerically as the solution to $$1 + \frac{O}{F_{opt}+O} = \frac{\alpha F_{opt}}{1-e^{-\alpha F_{opt}}}$$

where O is overhead, $F_{opt}$ is optimum frame size and $\alpha$=−ln (1-probability of bit error).

2. The method of claim 1, wherein if overhead is significantly larger than the frame size, the selected frame size is inversely proportional to the natural logarithm of the determined probability.

3. The method of claim 1, wherein the step of monitoring monitors the signal to noise ratio on the communications link.

4. The method of claim 1, wherein the step of monitoring monitors a frame error rate on the communications link.

5. The method of claim 1, wherein frames are transmitted over the communications link using the IEEE 802.11 media access control and physical layer protocol.

6. The method of claim 5 wherein the frame is one of a plurality of fragments in a transmitted fragment burst.

7. A system for transmitting frames on a communication link comprising:
   a monitoring routine which monitors the communications link to determine a probability of error on the link; and
   a frame sizer which selects frame size as a function of the determined probability and as a function of overhead, the frame size being is selected from a set of frame sizes computed numerically as the solution to $$1 + \frac{O}{F_{opt}+O} = \frac{\alpha F_{opt}}{1-e^{-\alpha F_{opt}}}$$

where O is overhead, $F_{opt}$ is optimum frame size and $\alpha$=−ln (1-probability of bit error).

8. The system of claim 7, wherein if overhead is significantly larger than the frame size, the selected frame size is inversely proportional to the natural logarithm of the determined probability.

9. The system of claim 7, wherein the monitoring routine monitors signal to noise ratio on the communications link.

10. The system of claim 7, wherein the monitoring routine monitors a frame error rate on the communications link.

11. The system of claim 7, wherein frames are transmitted over the communications link using the IEEE 802.11 media access control and physical layer protocol.

12. The system of claim 11, wherein the frame is one of a plurality of fragments in a transmitted fragment burst.

13. A system for transmitting frames on a communication link comprising:

means for monitoring the communications link to determine a probability of error on the link; and means for selecting frame size as a function of the determined probability and as a function of overhead, the frame size being selected from a set of frame sizes computed numerically as the solution to $$1 + \frac{O}{F_{opt} + O} = \frac{\alpha F_{opt}}{1 - e^{-\alpha F_{opt}}}$$

where O is overhead, $F_{opt}$ is optimum frame size and $\alpha = -\ln(1\text{-probability of bit error})$.

* * * * *